United States Patent
Chong et al.

(10) Patent No.: US 10,551,707 B2
(45) Date of Patent: Feb. 4, 2020

(54) ARRAY SUBSTRATE AND LIQUID CRYSTAL DISPLAY DEVICE INCLUDING THE SAME

(71) Applicant: SAMSUNG DISPLAY CO., LTD., Yongin, Gyeonggi-do (KR)

(72) Inventors: Joong Gun Chong, Yongin-si (KR); Nak Cho Choi, Hwaseong-si (KR); Je Hong Choi, Suwon-si (KR)

(73) Assignee: Samsung Display Co., Ltd. (KR)

( * ) Notice: Subject to any disclaimer, the term of this patent is extended or adjusted under 35 U.S.C. 154(b) by 381 days.

(21) Appl. No.: 15/015,881

(22) Filed: Feb. 4, 2016

(65) Prior Publication Data
US 2017/0059907 A1 Mar. 2, 2017

(30) Foreign Application Priority Data
Sep. 1, 2015 (KR) .................. 10-2015-0123473

(51) Int. Cl.
*G02F 1/1362* (2006.01)
*G02F 1/1368* (2006.01)

(52) U.S. Cl.
CPC ...... *G02F 1/1368* (2013.01); *G02F 1/136209* (2013.01); *G02F 1/136286* (2013.01); *G02F 2001/136218* (2013.01); *G02F 2001/136222* (2013.01); *G02F 2201/121* (2013.01); *G02F 2201/123* (2013.01)

(58) Field of Classification Search
CPC ... G02F 2001/136222; G02F 1/136227; G02F 1/133514; G02B 5/22; G09G 2300/0452; G09G 2320/0233
See application file for complete search history.

(56) References Cited

U.S. PATENT DOCUMENTS

| | | | |
|---|---|---|---|
| 7,012,658 B2 | 3/2006 | Sawasaki et al. | |
| 2007/0268421 A1* | 11/2007 | Chiu | G02F 1/133516 349/42 |
| 2008/0252828 A1* | 10/2008 | Shin | G02F 1/133514 349/106 |
| 2009/0251631 A1* | 10/2009 | Kim | G02F 1/133514 349/48 |
| 2010/0002172 A1* | 1/2010 | Kim | G02F 1/13394 349/106 |
| 2010/0321283 A1* | 12/2010 | Mizuno | G02F 1/136227 345/88 |

(Continued)

FOREIGN PATENT DOCUMENTS

KR 10-2007-0073171 A 7/2007

*Primary Examiner* — Paisley L Wilson
*Assistant Examiner* — Mariam Qureshi
(74) *Attorney, Agent, or Firm* — Innovation Counsel LLP

(57) ABSTRACT

An array substrate is provided. The array substrate includes: a first substrate; and a color filter layer disposed on the first substrate, wherein the color filter layer comprises: a first color filter that is located on the first substrate and comprises a recess and a sub-protrusion; and a second color filter that is located on the first substrate to be adjacent to the first color filter along a first direction, and comprises a protrusion protruding toward the recess of the first color filter. The sub-protrusion of the first color filter protrudes toward the protrusion of the second color filter and is at least partially superimposed with the protrusion.

19 Claims, 8 Drawing Sheets

(56) References Cited

U.S. PATENT DOCUMENTS

| | | | |
|---|---|---|---|
| 2011/0049519 A1* | 3/2011 | Kim | G02F 1/13624 257/59 |
| 2014/0002764 A1* | 1/2014 | Seo | H01L 33/0041 349/43 |
| 2015/0185551 A1* | 7/2015 | Kim | G02F 1/133514 349/110 |
| 2016/0327824 A1* | 11/2016 | Chen | G02F 1/13394 |

* cited by examiner

ARRAY SUBSTRATE AND LIQUID CRYSTAL DISPLAY DEVICE INCLUDING THE SAME This application claims priority from Korean Patent Application No. 10-2015-0123473 filed on Sep. 1, 2015 in the Korean Intellectual Property Office, the disclosure of which is incorporated herein by reference in its entirety.

BACKGROUND OF THE INVENTION

1. Field

The present disclosure relates to an array substrate and a liquid crystal display device including the same.

2. Description of the Related Art

A liquid crystal display device is configured so that a liquid crystal layer is formed between an array substrate and a counter substrate. The liquid crystal display device displays desired images by driving the liquid crystal layer using an electric field formed between a pixel electrode and a common electrode and by controlling the light transmittance for each pixel. A switching element located on the array substrate is electrically connected to the pixel electrode via a contact hole and applies a voltage the pixel electrode.

Recently, the resolution of the liquid crystal display device has gradually increased, thus an area of each pixel has decreased. However, there is a limit on the reduction in an area of the above-mentioned contact hole, despite the reduction in the area of each pixel. Therefore, when the contact hole has a reduced area, there is also a possibility that the electrical connection between the pixel electrode and the switching element may not be well established, thus the reliability of the liquid crystal display device may be compromised. In addition, a misalignment of the liquid crystal layer occurring between the pixel electrode and a peripheral wiring may degrade the display quality.

SUMMARY OF THE INVENTION

The present disclosure provides a liquid crystal display device with improved reliability and is capable of reducing a misalignment of a liquid crystal layer.

The present disclosure is not limited to the aspect mentioned above, and other aspects that have not been mentioned will be able to be clearly understood by those skilled in the art from the following description.

According to an aspect of the present disclosure, there is provided an array substrate. The array substrate includes: a first substrate; and a color filter layer disposed on the first substrate, wherein the color filter layer comprises: a first color filter that is located on the first substrate and comprises a recess and a sub-protrusion; and a second color filter that is located on the first substrate to be adjacent to the first color filter along a first direction, and comprises a protrusion protruding toward the recess of the first color filter. The sub-protrusion of the first color filter protrudes toward the protrusion of the second color filter and is at least partially superimposed with the protrusion.

A planar shape of the first color filter and a planar shape of the second color filter may be the same.

The array substrate may further include: a gate line that is located between the first substrate and the color filter layer and extends in the first direction; and a first data line and a second data line that are located between the first substrate and the color filter layer and extend in a second direction intersecting with the first direction. The first color filter and the second color filter may be at least partially superimposed with each other over the second data line.

The protrusion and the sub-protrusion may be at least partially superimposed with the second data line.

The second data line may include: a first portion that is superimposed with both of the first color filter and the second color filter; and a second portion that is continuous with the first portion, is superimposed with the second color filter, and is not superimposed with the first color filter.

The second portion may be superimposed with the protrusion.

The array substrate may further include: a shielding electrode that is located on the color filter layer and is superimposed with the second data line. The shielding electrode may include a first portion that is superimposed with both of the first color filter and the second color filter, and a second portion that is continuous with the first portion, is superimposed with the second color filter, and is not superimposed with the first color filter.

The shielding electrode may cover the second data line in a plan view.

The second portion may be superimposed with the protrusion.

The array substrate may further include: a thin film transistor that is located between the first substrate and the first color filter and is connected to the gate line and the first data line; and a pixel electrode that is located on the first color filter and is electrically connected to the thin film transistor. The shielding electrode may be spaced apart from the pixel electrode.

The shielding electrode and the pixel electrode may be made of the same material.

According to another aspect of the present disclosure, there is provided a liquid crystal display device. The liquid crystal display device includes: an array substrate; a counter substrate facing the array substrate; and a liquid crystal layer disposed between the array substrate and the counter substrate, wherein the array substrate comprises a first substrate and a color filter layer disposed on the first substrate, the color filter layer comprises a first color filter that is located on the first substrate and comprises a recess and a sub-protrusion, and a second color filter that is located on the first substrate to be adjacent to the first color filter along a first direction and comprises a protrusion protruding toward the recess of the first color filter. The sub-protrusion of the first color filter protrudes toward the protrusion and is at least partially superimposed with the protrusion of the second color filter. The counter substrate comprises a second substrate, and a common electrode located on one surface of the second substrate facing the array substrate.

The array substrate may further include: a gate line that is located between the first substrate and the color filter layer and extends in the first direction; a first data line and a second data line that are located between the first substrate and the color filter layer and extend in a second direction intersecting with the first direction; a thin film transistor that is located between the first substrate and the color filter layer is electrically connected to the gate line and the first data line; a pixel electrode that is located on the color filter layer and is electrically connected to the thin film transistor; and a shielding electrode that is located on the color filter layer, is spaced apart from the pixel electrode and is superimposed with the second data line. The first and second color filters may be at least partially superimposed with each other over the second data line.

A voltage of the same level may be applied to the common electrode and the shielding electrode.

The shielding electrode may cover the second data line in a plan view.

The shielding electrode and the pixel electrode may be made of the same material.

The second data line may include a first portion that is superimposed with both of the first color filter and the second color filter, and a second portion that is continuous with the first portion, is superimposed with the second color filter and is not superimposed with the first color filter.

The shielding electrode may include a first portion that is superimposed with both of the first color filter and the second color filter, and a second portion that is continuous with the first portion, is superimposed with the second color filter and is not superimposed with the first color filter.

The counter substrate may further include: a light-blocking member located between the second substrate and the common electrode. The light-blocking member may be superimposed with the recess and the thin film transistor.

Specific matters of other aspects are included in the detailed description and the drawings.

According to aspects of the present disclosure, there are at least the following effects; the liquid crystal display device has improved reliability and is capable of preventing a misalignment of the liquid crystal layer.

Effects of the present disclosure are not limited by those illustrated above, and furthermore various effects are included herein.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE INVENTION

Figure 1:
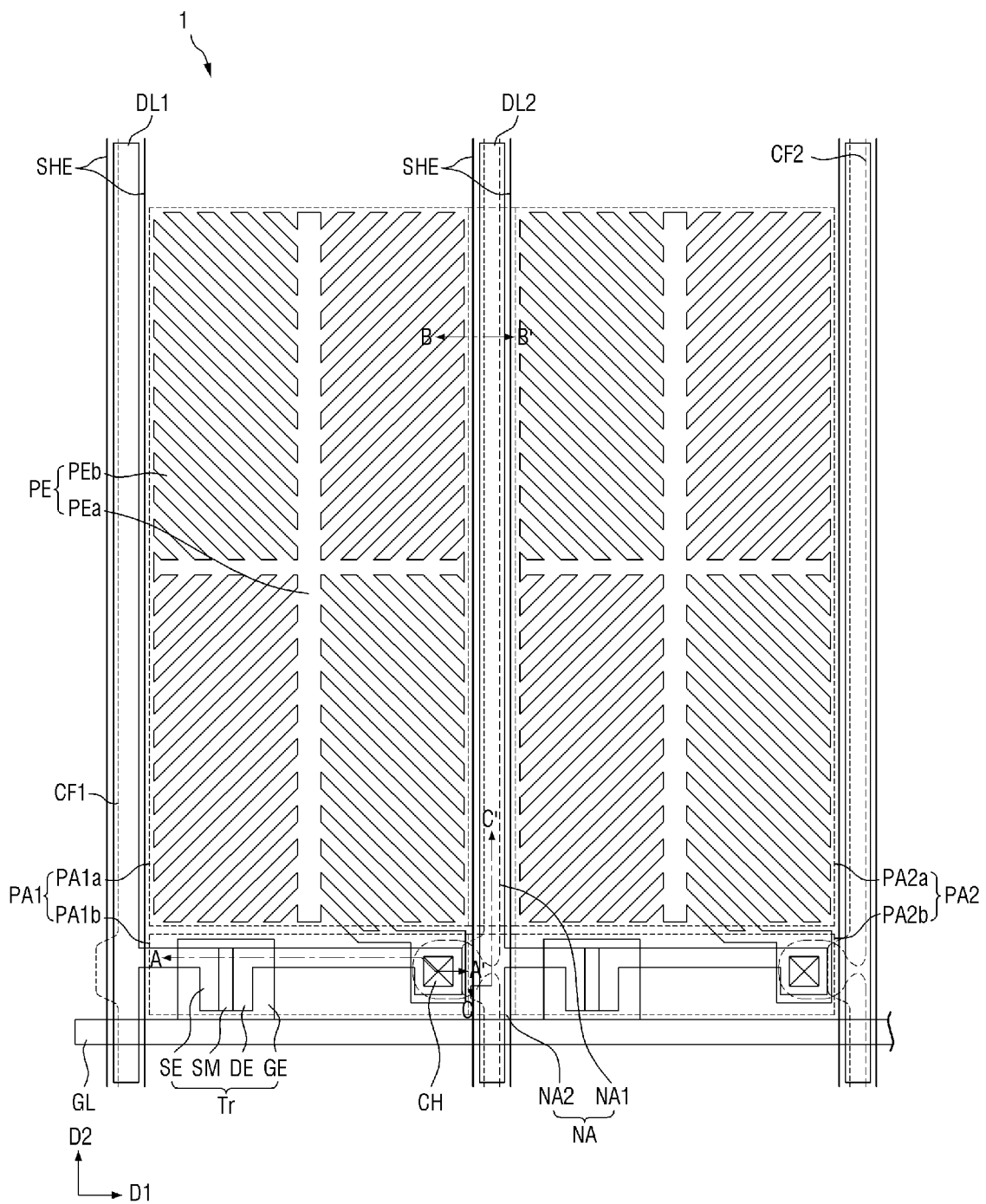
FIG. 1 is a schematic plan view of a liquid crystal display device according to an exemplary embodiment of the present disclosure, more specifically, a plan view schematically illustrating two pixel structures adjacent to each other.

Features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that the present disclosure will be thorough and complete and will fully convey the concept of the present disclosure to those skilled in the art. Like reference numerals refer to like elements throughout the specification.

The terminology used herein is for the purpose of describing particular embodiments only and is not intended to limit the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or one or more groups thereof.

It will be understood that when an element or layer is referred to as being "on", "connected to" or "coupled to" another element or layer, it can be directly on, connected, or coupled to the other element or layer or one or more intervening elements or layers may be present. In contrast, when an element is referred to as being "directly on," "directly connected to," or "directly coupled to" another element or layer, there may be no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers and/or sections should not be limited by these terms. These terms are used to distinguish one element, component, region, layer, or section from another region, layer, or section. Thus, a first element, component, region, layer, or section discussed below could be termed a second element, component, region, layer, or section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

Embodiments described herein describe and illustrate a liquid crystal display device of a vertical alignment mode or a patterned vertical alignment (PVA) mode as an example, but it is not limited thereto. The present disclosure may be applied to various display devices, such as a liquid crystal display device of an in-plane switching (IPS) type, a plane-line switching (PLS) type, a fringe-field switching (FFS) type, a twisted nematic (TN) type, and a display device of an electrically-controlled birefringence (ECB) type.

Moreover, the embodiments described herein describe and illustrate a case where the liquid crystal display device has a top common electrode configuration as an example, but it is not limited thereto. In addition, the present disclosure may also be applied to a case where the liquid crystal display device has a bottom common electrode configuration.

Figure 2:
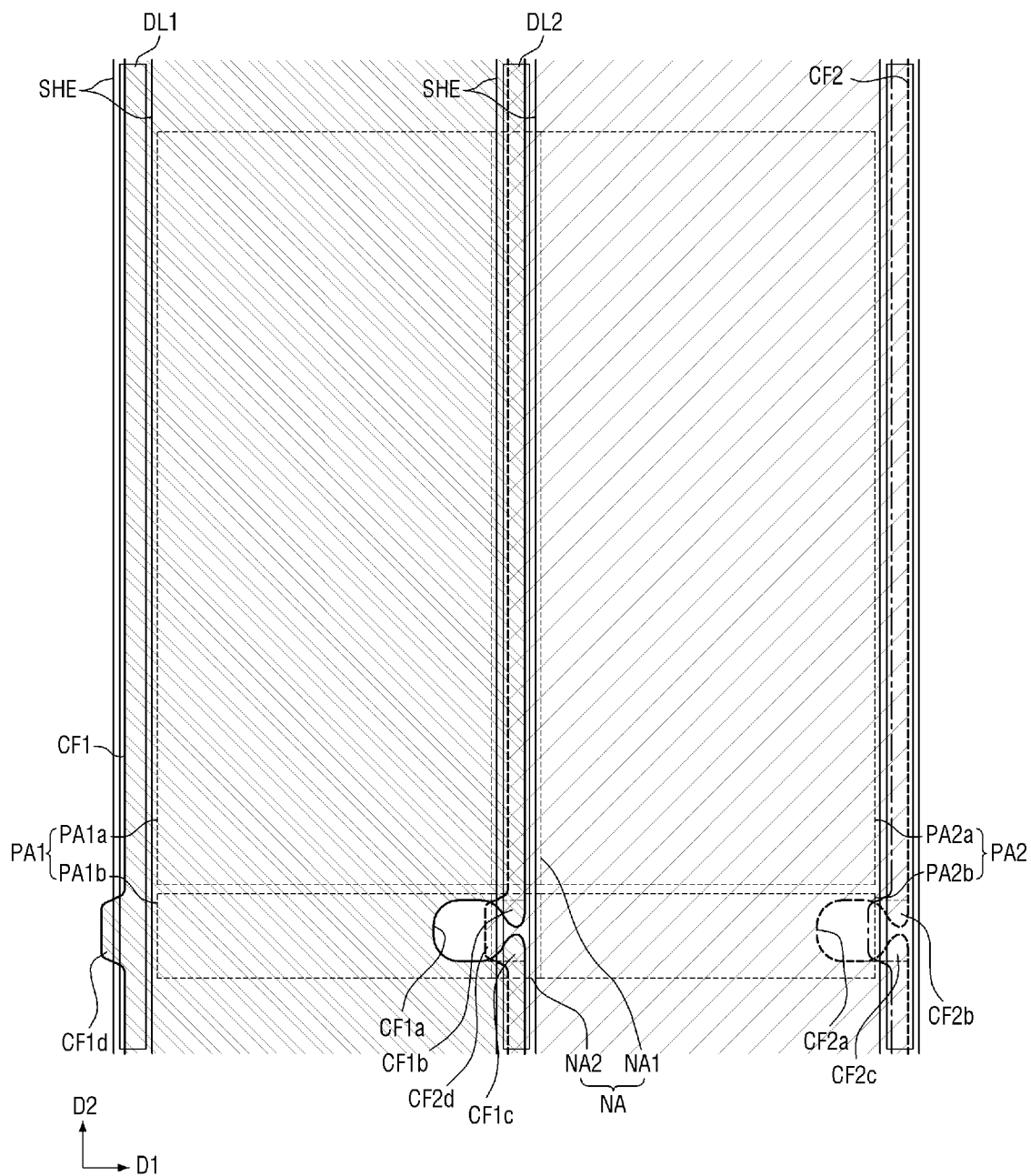
FIG. 2 is a plan view schematically illustrating an exemplary positional relation among a first color filter, a second color filter, data lines and shielding electrodes in the liquid crystal display device illustrated in FIG. 1.
Figure 3:
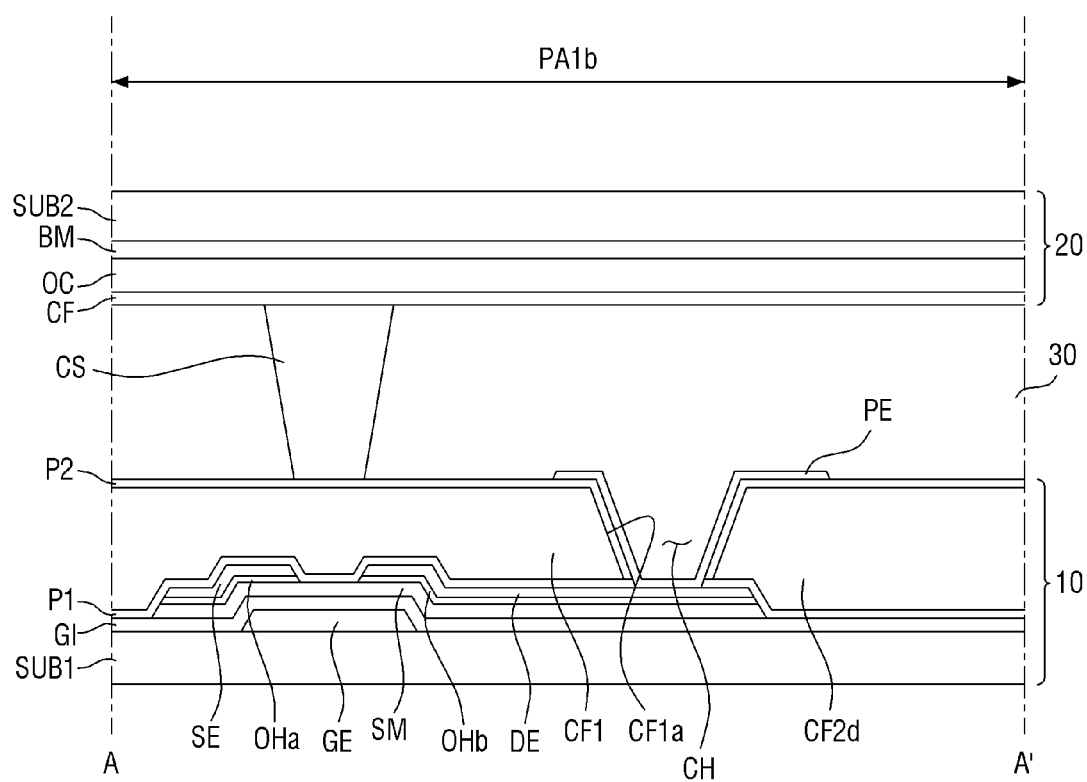
FIG. 3 is a schematic cross-sectional view taken along the line A-A' of the liquid crystal display device illustrated in FIG. 1.
Figure 4:
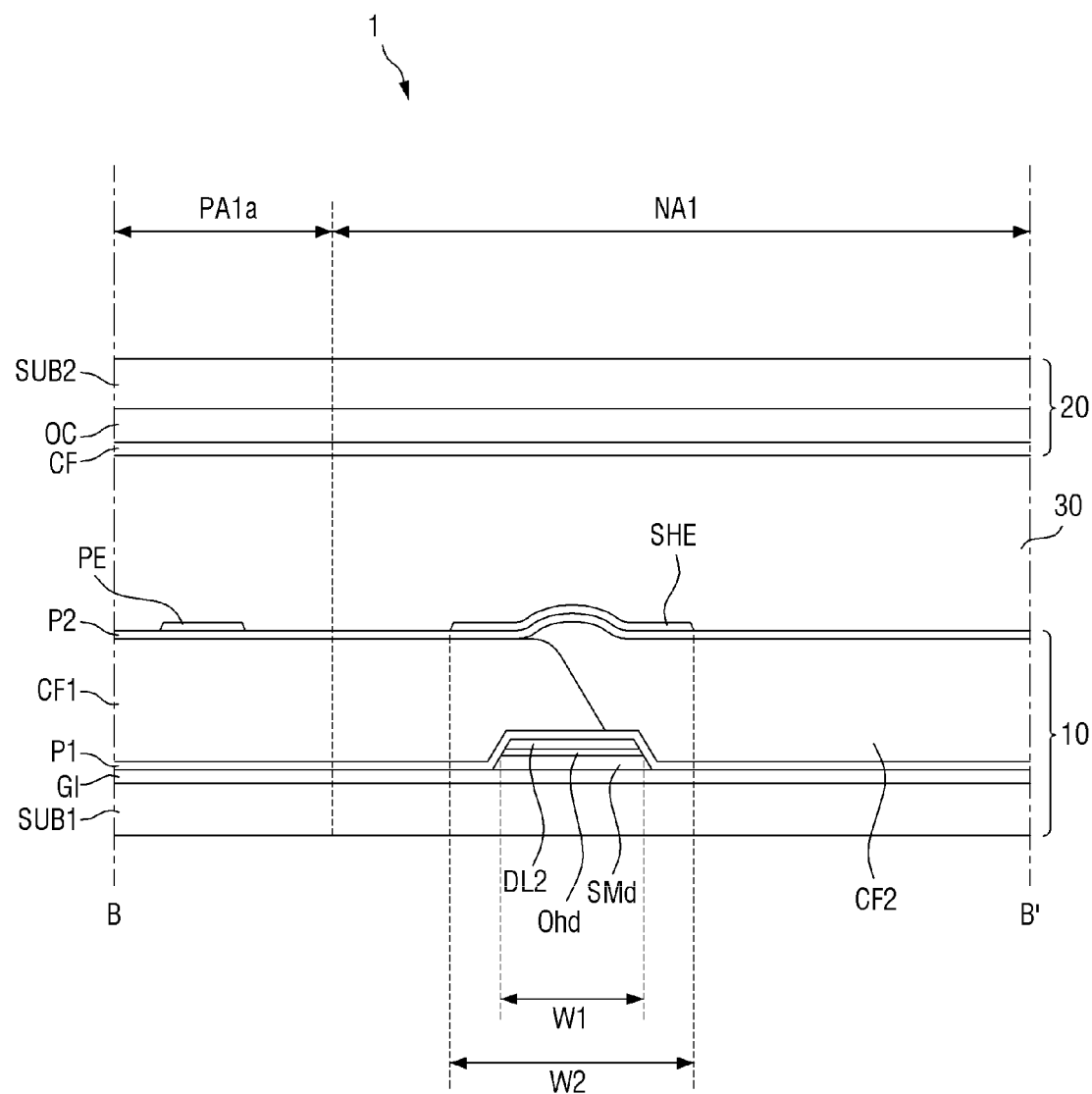
FIG. 4 is a schematic cross-sectional view taken along the line B-B' of the liquid crystal display device illustrated in FIG. 1.
Figure 5:
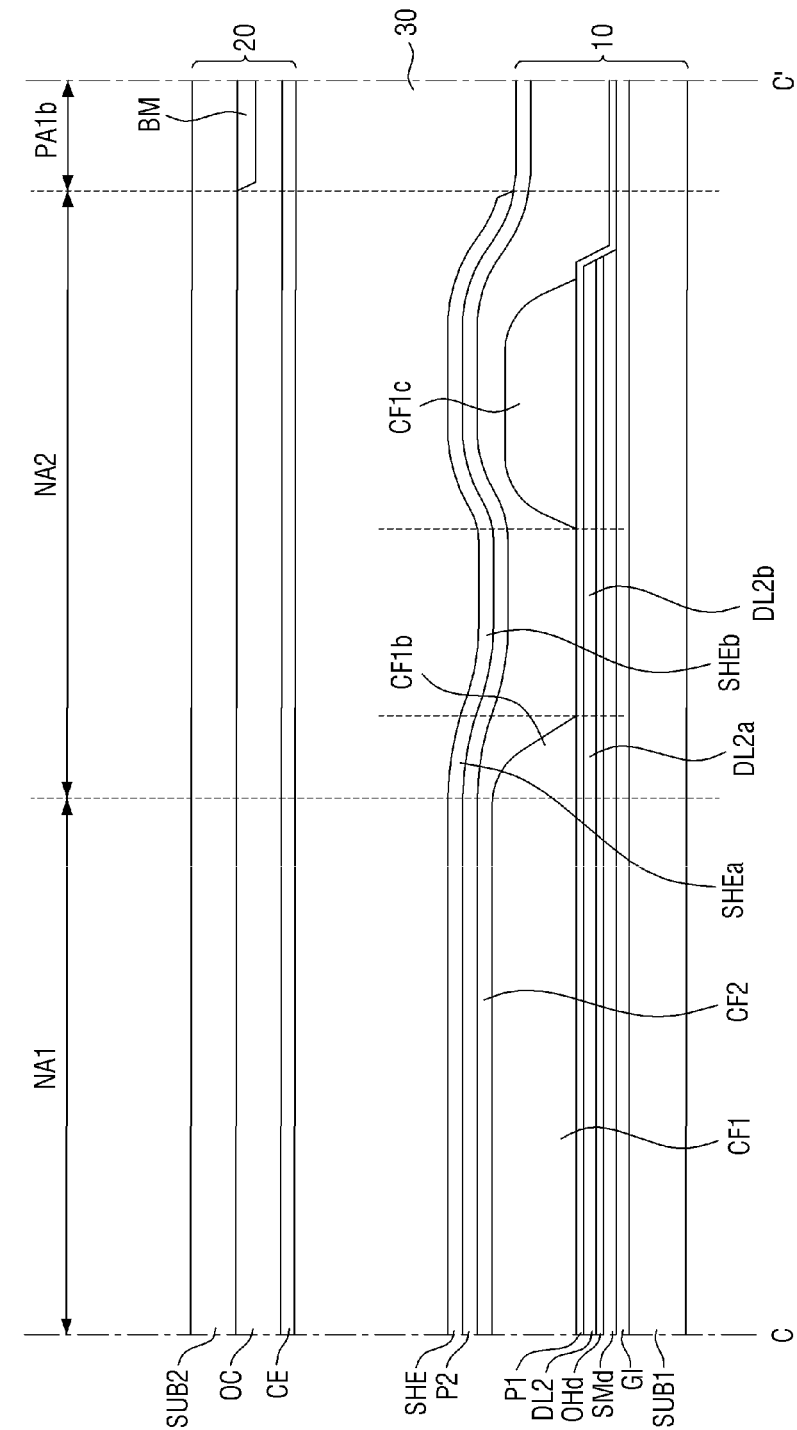
FIG. 5 is a schematic cross-sectional view taken along the line C-C' of the liquid crystal display device illustrated in FIG. 1.

Embodiments of the present disclosure will be described below referring to the drawings. FIG. 1 is a schematic plan view of a liquid crystal display device according to an exemplary embodiment of the present disclosure, more specifically, a plan view schematically illustrating two pixel structures adjacent to each other. FIG. 2 is a plan view schematically illustrating an exemplary positional relation among a first color filter, a second color filter, data lines and shielding electrodes in the liquid crystal display device illustrated in FIG. 1. FIG. 3 is a schematic cross-sectional view taken along the line A-A' of the liquid crystal display device illustrated in FIG. 1. FIG. 4 is a schematic cross-sectional view taken along the line B-B' of the liquid crystal display device illustrated in FIG. 1. FIG. 5 is a schematic cross-sectional view taken along the line C-C' of the liquid crystal display device illustrated in FIG. 1.

Referring to FIGS. 1 to 5, a liquid crystal display device 1 according to the embodiment includes an array substrate 10, a counter substrate 20 facing the array substrate 10, and a liquid crystal layer 30 located between the array substrate 10 and the counter substrate 20. The liquid crystal display device 1 may further include a pair of polarizers (not illustrated) attached to the outer surfaces of the array substrate 10 and the counter substrate 20.

FIGS. 1 and 2 illustrate 1×2 pixels located in a first pixel area PA1, and a second pixel area PA2 adjacent to the first pixel area PA1 along a first direction (or a direction D1). The first pixel area PA1 may include a first display area PA1a and a first circuit area PA1b, and similarly, the second pixel area PA2 may include a second display area PA2a and a second circuit area PA2b.

Further, a boundary area NA may be located between the first pixel area PA1 and the second pixel area PA2. The boundary area NA may include a first boundary area NA1 located between the first circuit area PA1a and the second circuit area PA2a, and a second boundary area NA2 that is located between the first circuit area PA1b and the second circuit area PA2b and is continuous with the first boundary area NA1.

The two pixels of the liquid crystal display device 1 according to the present exemplary embodiment, namely, the pixel located in the first pixel area PA1 and the pixel located in the second pixel area PA2 may have substantially the same structure. Therefore, hereinafter, the structure of the liquid crystal display device 1 according to the exemplary embodiment will be described on the basis of the pixels located in the first pixel area PA1, and the specific description of the pixel located in the second pixel area PA2 may be simplified or omitted.

First, the array substrate 10 will be described. The first substrate SUB1 may be a transparent insulating substrate. For example, the first substrate SUB1 may be made of a glass, a quartz, a transparent resin, or the like. In addition, the first substrate SUB1 may include a polymer or plastic having high heat resistance. In some embodiments, the first substrate SUB1 may be a flexible substrate that can be deformed by rolling, folding, bending, or the like.

The first substrate SUB1 may include a pixel area in which a single pixel is located, and the pixel area may be defined as an area in which the pixel electrode is located. As an example, as illustrated in FIG. 1, the pixel area may include a first pixel area PA1 and a second pixel area PA2. The first pixel area PA1 may include a first display area PA1a and a first circuit area PA1b, and the second pixel area PA2 may include a second display area PA2a and a second circuit area PA2b.

A gate line GL may be located on the first substrate SUB1. The gate line GL mainly extends in a first direction D1 and transmits a gate signal. A gate electrode GE that protrudes from the gate line GL and is connected to the gate line GL may be located on the first substrate SUB1. The gate line GL and the gate electrode GE may include an aluminum-based metal such as aluminum (Al) or aluminum alloy, a silver-based metal such as silver (Ag) or silver alloy, a copper-based metal such as copper (Cu) or copper alloy, a molybdenum-based metal such as molybdenum (Mo) or a molybdenum alloy, chromium (Cr), tantalum (Ta) and titanium (Ti). The gate line GL and the gate electrode GE may have a single-layer structure or a multilayer structure that includes at least two conductive films having physical properties different from each other.

A gate insulating film GI may be located on the gate line GL and the gate electrode GE. The gate insulating film GI may be made of an inorganic insulating material, for example, silicon oxide, silicon nitride, silicon oxynitride, or the like. The gate insulating film GI may be made up of a single-layer structure or a multilayer structure that includes at least two insulating layers having the physical properties different from each other.

A semiconductor layer SM may be located on the gate insulating film GI, and may be at least partially superimposed with the gate electrode GE. The semiconductor layer SM may include amorphous silicon, polycrystalline silicon, or an oxide semiconductor material.

A plurality of ohmic contact members may be located on the semiconductor layer SM. The plurality of ohmic contact members may include a source ohmic contact member OHa that is located below a source electrode SE, and a drain ohmic contact member OHb that is located below the drain electrode DE. The plurality of ohmic contacts OHa, OHb may be formed of an n+ hydrogenated amorphous silicon doped with an n-type impurity at a high concentration, or silicide.

The source electrode SE, the drain electrode DE, the first data line DL1, and the second data line DL2 may be located on the plurality of ohmic contacts OHa, OHb and the gate insulating film GI. The first data line DL1 and the second data line DL2 may transmit the data voltage, and may extend mainly in a second direction (or a direction D2) intersecting with the first direction (D1 direction) to intersect with the gate line GL.

In the exemplary embodiment, the gate line GL and the first data line DL1 may intersect with each other to define the first pixel area PA1, and the gate line GL and the second data line DL2 may intersect with each other to define the second pixel area PA2. In the exemplary drawings, the first data line DL1 may be located on the left side of the first pixel area PA1, and the second data line DL2 may be located between the first pixel area PA1 and the second pixel area PA2, that is, in the boundary area NA.

Meanwhile, in some embodiments, a semiconductor pattern SMd and a data ohmic contact member OHd may be disposed between the first data line DL1 and the gate insulating film GI, and between the second data line DL2 and the gate insulating film GI. The semiconductor pattern SMd may include the same material as the semiconductor layer SM, and the data ohmic contact member OHd may include the same material as the source ohmic contact member OHa and the drain ohmic contact member OHb. In some embodiments, when the semiconductor layer SMd and the semiconductor pattern SM are an oxide semiconductor, the data ohmic contact member OHd, the source ohmic contact member OHa and the drain ohmic contact members OHb may be omitted.

The source electrode SE may be connected to the first data line DL1, and may protrude from the first data line DL1 to an upper part of the gate electrode GE. The drain electrode DE may be spaced apart from the source electrode SE on the gate electrode GE. The drain electrode DE may include a rod-like portion extending substantially parallel to the source electrode SE, and an extension of the opposite side.

The first data line DL1, the second data line DL2, the source electrode SE, and the drain electrode DE may be formed of aluminum, copper, silver, molybdenum, chromium, titanium, tantalum or an alloy thereof, and may have, but not limited to, a multilayer structure that is made of a lower film such as a refractory metal and a low-resistance upper film (not illustrated) formed thereon.

The gate electrode GE, the source electrode SE, the drain electrode DE, and the semiconductor layer SM form a single thin film transistor Tr, and a channel of the thin film transistor Tr is formed between the source electrode SE and the drain electrode DE of the semiconductor layer SM. The thin film transistor Tr may be located in a first circuit area PA1b of a first pixel area PA1.

A first passivation layer P1 may be located on the gate insulating film GE, the semiconductor layer SM, the source electrode SE, and the drain electrode DE. The first passivation layer P1 may include an inorganic insulating material, such as silicon oxide, silicon nitride, and silicon oxynitride. The first passivation layer P1 may protect the thin film transistor Tr and may prevent the substance contained in color filter layers CF1 and CF2 from being introduced into the semiconductor layer SM.

The color filter layers CF1 and CF2 may be located on the first passivation layer SM. The color filter layers CF1 and CF2 may include a the first color filter CF1 located in the first pixel area PA1, and a second color filter CF2 located in the second pixel area PA2.

The first color filter CF1 and the second color filter CF2 may include a color pigment that allows light of a particular color wavelength to pass. The colors of the first color filter CF1 and the second color filter CF2 may be different from each other. In the exemplary embodiment, the first color filter CF1 may display one of primary colors, such as three primary colors of red, green and blue, or may display one of cyan, magenta, yellow and white. Further, the second color filter CF2 may display a color different from the first color filter CF1.

The first color filter CF1 and the second color filter CF2 adjacent to each other along the first direction (D1 direction) may be disposed to partially extend to the first boundary area NA1 of the boundary area NA. The first color filter CF1 and the second color filter CF2 may be superimposed with each other on the second data line DL2. In some embodiments, at least a part of the second color filter CF2 may be located over the first color filter CF1.

When viewed in a plan view, for example, in FIG. 2, the first color filter CF1 may include a first recess CF1a, first sub-protrusions CF1b and CF1c, and a first protrusion CF1d, and the second color filter CF2 may include a second recess CF2a, second sub-protrusions CF2b and CF2c, and a second protrusion CF2d. The first recess CF1a may be located in the first circuit area PA1b and may be located around a contact hole CH.

The first sub-protrusions CF1b and CF1c are portions of the first color filter CF1 that protrude substantially in the second direction (D2 direction) or toward the second protrusion CF2d. The first sub-protrusions CF1b and CF1c may be located in the boundary area NA or the second boundary area NA2, and may be superimposed with the second color filter CF2 in the second boundary area NA2. Further, the first sub-protrusions CF1b and CF1c may be at least partially superimposed with the second data line DL2 in the second boundary area NA2.

The first portion CF1b protrudes downward, and the second portion CF1c protrudes upward based on the drawings. The end portions of the first portion CF1b and the second portion CF1b may be spaced apart from each other. Further, between the first portion CF1b and the second portion CF1c, the first color filter CF1 may not be located, and only a part of the second color filter CF2 may be located.

The first protrusion CF1d is a portion of the first color filter CF1 protruding in a direction toward the first data line DL1, and may protrude substantially in the first direction (D1 direction). The first protrusion CF1d may protrude toward a pixel area located in front of the first pixel area PA1, hereinafter referred to as "a previous pixel area" that is located on the opposite side to the second pixel area PA2 based on the first pixel area PA1.

The second recess CF2a may be located in the second circuit area PA2b, and may be located around the contact hole of the second pixel area PA2, similarly to the first recess CF1a. The second sub-protrusions CF2b and CF2c are portions of the second color filter CF2 that protrude substantially toward the second direction (D2 direction). The second sub-protrusions CF2b and CF2c may be located in a boundary area between the second pixel area PA2 and a pixel area adjacent to the second pixel area PA2, and may be at least partially superimposed with the data line located on the right side of the second pixel area PA2. The first portion CF2b protrudes downward, and the second portion CF2c protrudes upward based on the drawings. The end portions of the first portion CF2b and the second portion CF2b may be spaced apart from each other.

The second protrusion CF2d is a portion of the second color filter CF2 that protrudes in a direction toward the second data line DL2 or toward the first recess CF1a, and may protrude substantially in the first direction (D1 direction). The second protrusion CF2d may protrude toward the first circuit area PA1b through the second boundary area NA2. The end portion of the second protrusion CF2d may be located around the contact hole CH of the first pixel area PA1. In some embodiments, the second protrusion CF2d may not be located in the first display area PAa. The second protrusion CF2d may be superimposed with the first portion CF1b and the second portion CF1c of the first sub-protrusions in the second boundary area NA2. In some embodiments, at least a part of the second protrusion CF2d may be located above the first portion CF1b and the second portion CF1c of the first sub-protrusions. Therefore, even when the first recess CF1a is formed in the first color filter CF and the second protrusion CF2d is formed in the second color filter CF2, a gap is not formed between the first color filter CF1 and the second color filter CF2 by the first sub-protrusions CF1b and CF1c.

Hereinafter, an arrangement relation among the first color filter CF1, the second color filter CF2, and the second data line DL2 will be described based on the second data line DL2. As described above, the first color filter CF1 and the second color filter CF2 may be superimposed with each other in the first boundary area NA1. Further, the first sub-protrusions CF1b and CF1c, and the second color filter CF2 may be superimposed with each other in the second boundary area NA2. A superimposed part between the first color filter CF1 and the second color filter CF2 in the first boundary area NA1 is referred to as a first superimposed part, and a superimposed part between the first sub-protrusions CF1b, CF1c and the second color filter CF2 or between the first sub-protrusions CF1b, CF1c and the second protrusion CF2d in the second boundary area NA2 is referred to as a second superimposed part. A part in which the first color filter CF1 is not located and the second color filter CF2 is located between the first portion CF1b and the second portion CF1c of the first sub-protrusions CF1b, CF1c is referred to as a non-superimposed part. The first superimposed part, the second superimposed part, and the non-superimposed part are continuous rather than being spaced apart from one another.

Both of the first color filter CF1 and the second color filter CF2 are present in the first superimposed part, and similarly, both of the first color filter CF1 and the second color filter CF2 are present in the second superimposed part. The first color filter CF1 is not located, but only the second color filter CF2 is located in the non-superimposed part.

The second data line DL2 includes a portion superimposed with the first superimposed part, the second superimposed part, and the non-superimposed part. That is, the second data line DL2 includes a first portion DL2a that is superimposed with both of the first color filter CF1 and the second color filter CF2, and a second portion DL2b that is not superimposed with the first color filter CF1 but is superimposed with the second color filter CF2, and the first portion DL2a and the second portion DL2b are continuous rather than being spaced apart from each other.

A second passivation layer P2 may be located above the first color filter CF1 and the second color filter CF2. The second passivation layer P2 may include an inorganic insulating material, such as silicon oxide, silicon nitride and silicon oxynitride. The second passivation layer P2 may prevent the first color filter CF1 and the second color filter CF2 from floating, and may further suppress the liquid crystal layer 30 from being contaminated by an organic material, such as solvent introduced from the first color filter CF1 and the second color filter CF2. Thus, to the second passivation layer P2 can prevent defects, such as a residual image that may occur when driving the liquid crystal display device 1.

In some embodiments, a planar shape of the first color filter CF1 and a planar shape of the second color filter CF2 may be substantially the same. For example, when viewed in a plan view, the shape of the first recess CF1a and the shape of the second recess CF2a may be substantially the same, and the shapes of the first sub-protrusions CF1b and CF1c and the shapes of the second sub-protrusions CF2b and CF2c may be substantially the same. In addition, the shape of the first protrusion CF1d and the shape of the second protrusion CF2d may also the same. In such a case, the first color filter CF1 and the second color filter CF2 may be formed using a single mask. As an example, the first color filter CF1 may be formed using a single mask, and the second color filter CF2 may be formed by moving the mask in the first direction (D1 direction).

Of the first passivation layer P1 and the second passivation layer P2, in a portion corresponding to a space surrounded by the first recess CF1a and the second protrusion CF2d, a contact hole CH that exposes a part of the drain electrode DE may be formed. The pixel electrode PE may be located on the second passivation layer P2, and the pixel electrode PE may be located in the first display area PA1a of the first pixel area PA1. A part of the pixel electrode PE may extend to the first circuit area PA1b and may be connected to the drain electrode DE through the contact hole CH. That is, in the liquid crystal display device 1 according to this embodiment, since the contact hole CH is located within the space surrounded by the first recess CF1a and the second protrusion CF2d, there is no need to remove the contact hole CH in the formation process of the color filter layers CF1 and CF2. Therefore, there is an advantage of being able to prevent a connection failure between the pixel electrode PE and the drain electrode DE that may occur because the color filter layers CF1 and CF2 are not partially removed. Further, even when the area of the first pixel area PA1 decreases depending on attainment of the high-resolution, since a space for forming the contact hole CH using the first recess CF1a and the second protrusion CF2d having configurations different from each other, there is also an advantage of being able to relatively reduce an area of the contact hole CH or adjust an area of the contact hole CH.

The first circuit area PA1b of the first pixel area PA1 is an area of the first pixel area PA1 in which a thin film transistor Tr and a contact hole CH are formed. The first circuit area PA1B may be defined as an area in which the liquid crystal molecules of the liquid crystal layer 30 may not be substantially controlled. The first display area PA1a may be defined as an area of the first pixel area PA1 other than the first circuit area PA1b. In the first display area PA1, the liquid crystal molecules may be controlled by the pixel electrode PE.

The pixel electrode PE may include a stem PEa, and a plurality of branches PE1b that extend to radially protrude from the stem PEa. The stem PEa may be provided in various shapes. As an example, as illustrated in FIG. 1, the stem PEa may have a cross shape. In this case, the pixel located in the first pixel area PA1 may be divided into four domains by the stem PEa.

The branches PEb may extend in different directions for each domain to correspond to each domain. For example, the branches PEb extend in parallel to each other within each domain divided by the stem PEa and are arranged to be spaced apart from each other. The mutually adjacent branches PEb may be spaced apart from each other at a distance of micrometer unit to form a plurality of fine slits.

The pixel electrodes PE may be formed of a transparent conductive material. For example, the pixel electrode PE may be made of ITO, IZO, ITZO and AZO.

A shielding electrode SHE may be located on the second passivation layer P2. The shielding electrode SHE may be physically spaced apart from the pixel electrode PE, and may be located on the same layer as the pixel electrode PE. As an example, in the same manner as the pixel electrode PE, the shielding electrode SHE may be located above the second passivation layer P2 to be in direct contact with the second passivation layer P2. The shielding electrode SHE may be made of a transparent conductive material and may be made of the same material as the pixel electrode PE. In some embodiments, the shielding electrode SHE and the pixel electrode PE1 may be simultaneously formed through a photolithography process using a single mask.

The shielding electrode SHE may be located over the second passivation layer P2 in a portion corresponding to the first data line DL1 and the second data line DL2, and may be superimposed with the first data line DL1 and the second data line DL2. In an exemplary embodiment, the shielding electrode SHE may be located in the boundary area NA between the first pixel area PA1 and the second pixel area PA2. When viewed in a plan view, a line width W2 of the shielding electrode SHE in the first direction (D1 direction)

may be greater than a line width W1 of the second data line DL2 in the first direction (D1 direction), and the shielding electrode SHE may cover the second data line DL2. In some embodiments, a voltage of the same level as the common voltage applied to a common electrode CE may be applied to the shielding electrode SHE.

Hereinafter, an arrangement relation among the shielding electrode SHE, the first color filter CF1, and the second color filter CF2 will be described. As described above, the first color filter CF1 and the second color filter CF2 may be superimposed with each other in the first boundary area NA1. Further, the first sub-protrusions CF1$b$ and CF1$c$ and the second color filter CF2 may be superimposed with each other in the second boundary area NA2. A superimposed part between the first color filter CF1 and the second color filter CF2 in the first boundary area NA1 is referred to as a first superimposed part, and a superimposed part between the first sub-protrusions CF1$b$ and CF1$c$ and the second color filter CF2 or between the first sub-protrusions CF1$b$ and CF1$c$ and the second protrusion CF2$d$ in the second boundary area NA2 is referred to as a second superimposed part. A part in which the first color filter CF1 is not located and the second color filter CF2 is located between the first portion CF1$b$ and the second portion CF1$c$ is referred to as a non-superimposed part. The first superimposed part, the second superimposed part and the non-superimposed part are continuous rather than being spaced apart from one another.

Both of the first color filter CF1 and the second color filter CF2 are present in the first superimposed part, and similarly, both of the first color filter CF1 and the second color filter CF2 are present in the second superimposed part. The first color filter CF1 may not be located but the second color filter CF2 may be located in the non-superimposed part.

Since the shielding electrode SHE is superimposed with the second data line DL2 and may cover the second data line DL2 in a plan view, the shielding electrode SHE includes a portion that is superimposed with the first superimposed part, the second superimposed part, and the non-superimposed part. That is, the shielding electrode SHE includes a first portion SHEa that is superimposed with both of first color filter CF1 and the second color filter CF2, and a second portion SHEb that is not superimposed with the first color filter CF1 but is superimposed with the second color filter CF2. The first portion SHEa and the second portion SHEb are continuous rather than being spaced apart from each other.

As described above, the first sub-protrusions CF1$b$ and CF1$c$ and the second color filter CF2 are superimposed with each other to form the second superimposed part. Therefore, even when the first recess CF1$a$ is formed in the first color filter CF, no gap is formed between the first color filter CF1 and the second color filter CF2 by the first sub-protrusions CF1$b$ and CF1$c$. When the second superimposed part does is not present, a gap may be formed between the first color filter CF1 and the second color filter CF2, and there is a possibility that a conductor for forming the shielding electrode SHE or the pixel electrode PE may remain in the gap. In such a case, the pixel electrode PE and the shielding electrode SHE may be short-circuited to each other, or a short-circuit between the conductor and the other configurations in the gap may occur. In the case of the liquid crystal display device 1 according to this exemplary embodiment, the second superimposed part prevents a gap from being formed between the first color filter CF1 and the second color filter CF2. Thus, the second superimposed part prevents a situation in which a conductor for forming the shielding electrode SHE or the pixel electrodes PE from remaining from causing a defect, and can improve the reliability of the liquid crystal display device 1.

Since the electric field formed between the pixel electrode PE and the common electrode CE is relatively small in a portion between the first data line DL1 and the pixel electrode PE, and a portion between the second data line DL2 and the pixel electrodes PE, the liquid crystal molecules may be misaligned in these portions. In the liquid crystal display device 1 according to this embodiment, a voltage of the same level as the voltage applied to the common electrode CE, for example, a common voltage may be applied to the shielding electrode SHE. Thus, the electric field may not be formed between the common electrode CE and the shielding electrode SHE. Therefore, the possibility that the liquid crystal molecules located around the first data line DL1 and the second data line DL2 are misaligned may decrease, and the light leakage may decrease. In addition, an area of a light-blocking member BM formed to prevent the light leakage may be further reduced or omitted. Therefore, an aperture ratio of the liquid crystal display device 1 may further increase.

The shielding electrode SHE may weaken an electric field generated among the first data line DL1, the second data line DL2 and the pixel electrode PE. The weakened electric field has an advantage of being able to suppress a crosstalk, thereby improving the display quality of the liquid crystal display device 1.

The counter substrate 20 will be described below. The counter substrate 20 may include a second substrate SUB2, a light-blocking member BM, an overcoat layer OC, and a common electrode CE. The second substrate SUB2 may be a transparent insulating substrate, similar to the first insulating substrate SUB1. Further, the second substrate SUB2 may also include a polymer or plastic having high heat resistance. In some embodiments, the second substrate SUB2 may be made of a flexible material.

The light-blocking member BM is located on one side of the second substrate SUB2 that faces the array substrate 10. The light-blocking member BM is also referred to as a black matrix and prevents the light leakage. In some embodiments, the light-blocking member BM may be located in a portion corresponding to the first circuit area PA1$b$ in which the thin film transistor Tr, the first recess CF1$a$, and the contact hole CH are located. The light-blocking member BM may be similarly located in a portion corresponding to the second circuit area PA2$b$. In addition, in some embodiments, the light-blocking member BM may also be located in a portion corresponding to the second boundary area NA2 between the first circuit area PA1$b$ and the second circuit area PA2$b$.

In some embodiments, the light-blocking member BM may not be located in a portion corresponding to at least a part of the first data line DL1 and the second data line DL2. As an example, the light-blocking member BM may not be located in a portion corresponding to the second data line DL2 located in the first boundary area NA1. The light-blocking member BM may include a light-blocking pigment such as carbon black or a non-transparent material such as chromium (Cr), and may include a photosensitive organic material.

In the liquid crystal display device 1 according to the illustrated embodiment, the light-blocking member BM is located on the counter substrate 20, but the light-blocking member BM of the liquid crystal display device 1 may be located on the array substrate 10.

The overcoat layer OC may be formed on a surface of the second substrate SUB2 to cover the light-blocking member BM. The overcoat layer OC may flatten the step formed by the light-blocking member BM. The overcoat layer OC may also be omitted in some embodiments.

The common electrode CE may be located on the overcoat layer OC. When the overcoat layer OC is omitted in some embodiments, the common electrode CE may be located on the second substrate SUB2 and the light-blocking member BM. The common electrode CE may be made of a transparent conductive material such as ITO and IZO. In some embodiments, the common electrode CE may be formed over the entire surface of the second substrate SUB2. The common voltage may be applied to the common electrode CE to form an electric field with the pixel electrode PE, the alignment of liquid crystal molecules in the liquid crystal layer 30 change depending on the magnitude of the electric field, and the light transmittance through the pixel may be controlled.

A spacer CS may be located on one side of the common electrode CE facing the array substrate 10. The spacer CS may protrude toward the array substrate 10, and may contact with the array substrate 10 to maintain a space between the counter substrate 20 and the array substrate 10. In another embodiment, the spacer CS may also be located on the array substrate 10 side. In some embodiments, the spacer CS may be made of an organic insulating material and may have photosensitivity.

The spacer CS may be disposed to be superimposed with the thin film transistor Tr. By disposing the spacer CS to be superimposed with the thin film transistor Tr, the size of the light-blocking member BM may be relatively reduced, and the aperture ratio of the liquid crystal display device 1 may be improved.

Next, the liquid crystal layer 30 will be described. The liquid crystal layer 30 may include liquid crystal molecules having dielectric anisotropy. When an electric field is applied between the array substrate 10 and the counter substrate 20, the liquid crystal molecules may be oriented in a specific direction between the array substrate 10 and the counter substrate 20 to transmit or block the light.

Figure 6:
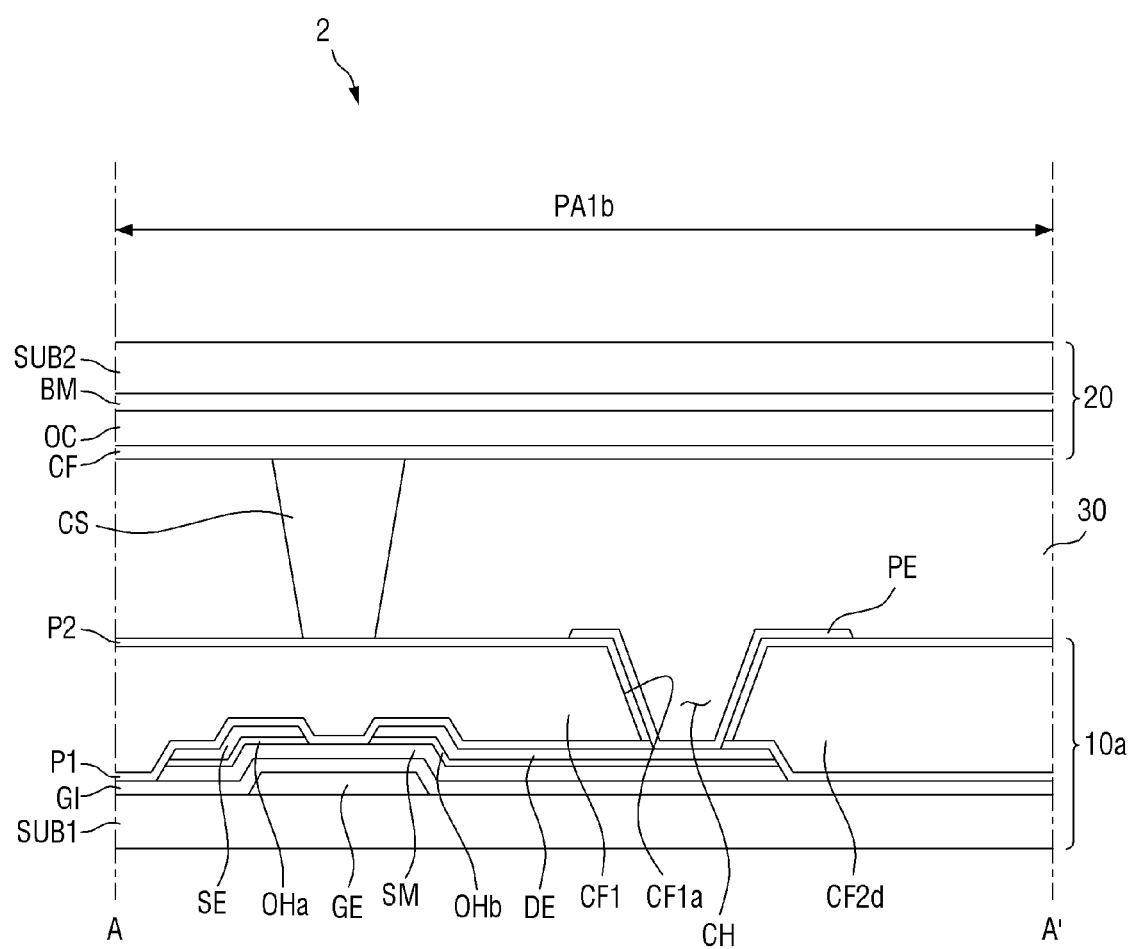
FIG. 6 is a schematic cross-sectional view taken along the line A-A' of a modified example of the liquid crystal display device illustrated in FIG. 1.
Figure 7:
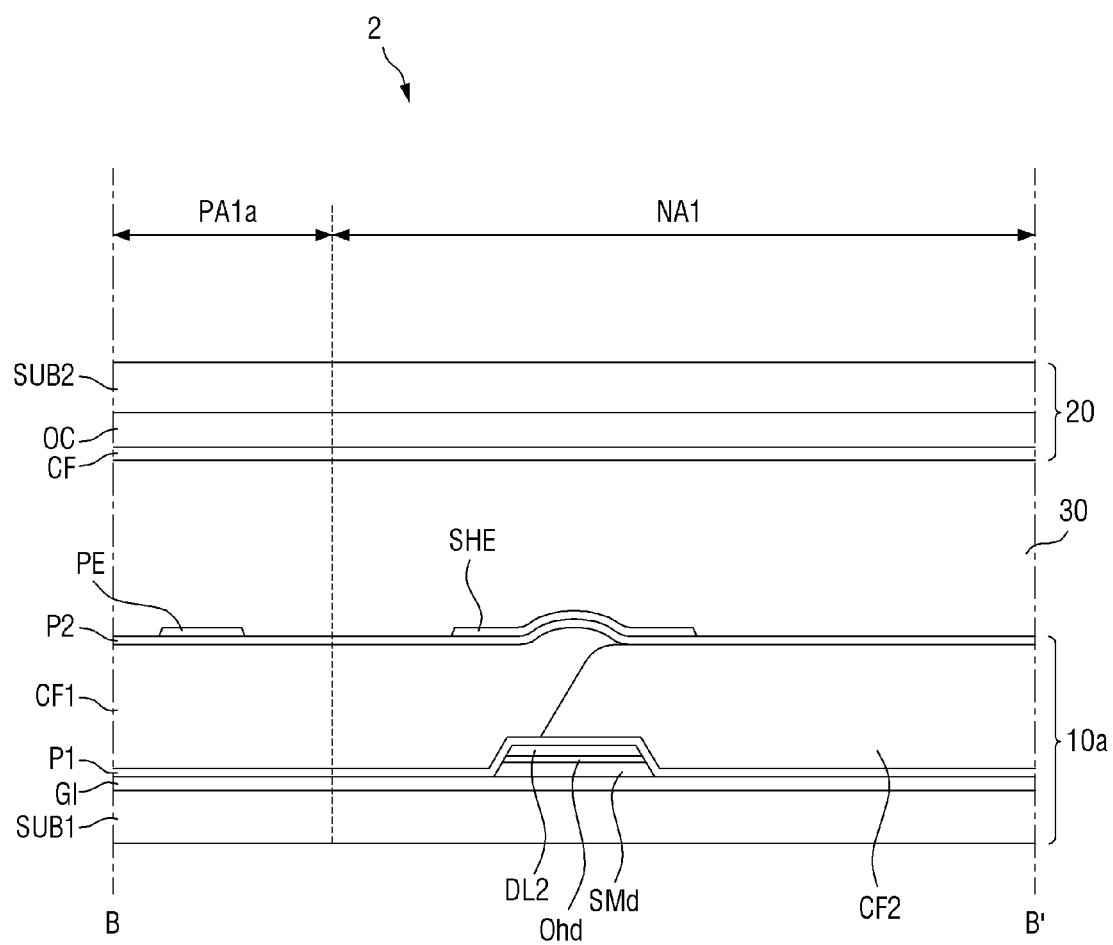
FIG. 7 is a schematic cross-sectional view taken along the line B-B' of a modified example of the liquid crystal display device illustrated in FIG. 1.
Figure 8:
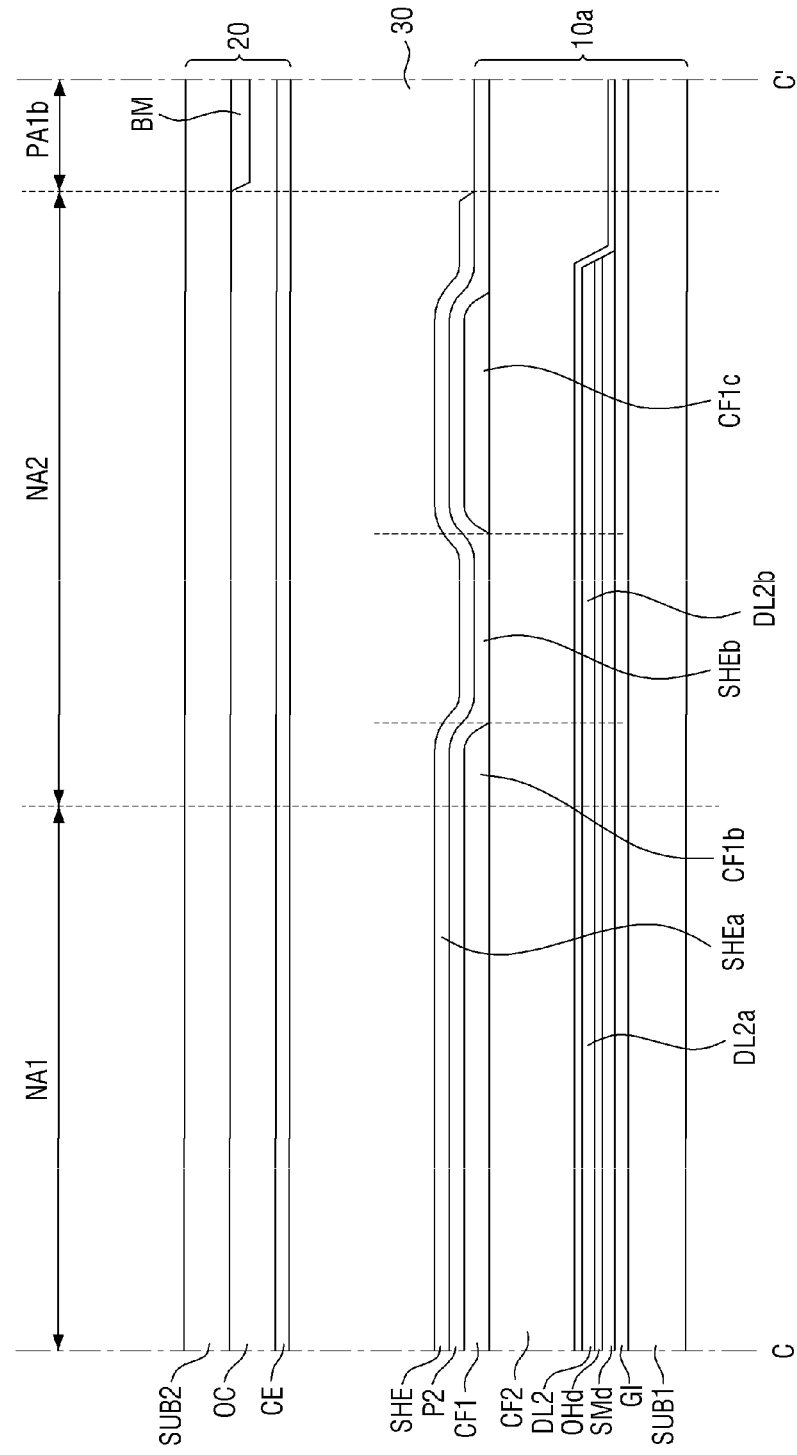
FIG. 8 is a schematic cross-sectional view taken along the line C-C' of a modified example of the liquid crystal display device illustrated in FIG. 1.

FIG. 6 is a schematic cross-sectional view of a modified example of the liquid crystal display device illustrated in FIG. 1 taken along the line A-A'. FIG. 7 is a schematic cross-sectional view of a modified example of the liquid crystal display device illustrated in FIG. 1 taken along the line B-B'. FIG. 8 is a schematic cross-sectional view of a modified example of the liquid crystal display device illustrated in FIG. 1 taken along the line C-C'.

Referring to FIGS. 6 to 8, a liquid crystal display device 2, according to this embodiment, may include an array substrate 10a, a counter substrate 20 facing the array substrate 10a, and a liquid crystal layer 30 located between the array substrate 10a and the counter substrate 20. The liquid crystal display device 2 may further include a pair of polarizers (not illustrated) attached to the outer surfaces of the array substrate 10a and the counter substrate 20.

In the liquid crystal display device 2, the structure of the array substrate 10a is partially different from the array substrate 10 shown in FIGS. 3 to 5. Specifically, differences exist in that the first color filter CF1 is located above the second color filter CF2, when the first color filter CF1 and the second color filter CF2 are superimposed with each other. Thus, thereinafter, repeated description will be omitted, and differences between the structure of the liquid crystal display devices 1 and 2 will be mainly described.

The first color filter CF1 and the second color filter CF2 may be superimposed with each other in the first boundary area NA1, and at least a part of the first color filter CF1 may be located above the second color filter CF2. Similarly, first sub-protrusions CF1b and CF1c of the first color filter CF1 may be superimposed with the second color filter CF2 or the second protrusion CF2d of the second color filter CF2 in the second boundary area NA2, and the first sub protrusions CF1b and CF1c of the first color filter CF1 may be located above the second color filter CF2 or the second protrusion CF2d of the second color filter CF2.

The description of other structural elements is substantially identical or similar to the description of FIGS. 1 to 5, and it will be omitted.

While the present disclosure has been particularly illustrated and described with reference to exemplary embodiments thereof, it will be understood by those of ordinary skill in the art that various changes in form and detail may be made without departing from the spirit and scope of the present disclosure. The exemplary embodiments should be considered in a descriptive sense and not for purposes of limitation.

What is claimed is:
1. An array substrate comprising:
a first substrate;
a color filter layer disposed on the first substrate;
a gate line that is located between the first substrate and the color filter layer and extends in a first direction; and
a first data line and a second data line that are located between the first substrate and the color filter layer and extend in a second direction intersecting with the first direction,
wherein the color filter layer comprises:
a first color filter that is located on the first substrate, has a first side that extends substantially parallel to the second direction, and comprises a recess that is recessed from the first side and a sub-protrusion;
a second color filter that is located on the first substrate to be adjacent to the first color filter along the first direction, has a second side that extends substantially parallel to the second direction, and comprises a protrusion protruding from the second side toward the recess of the first color filter in the plan view,
a thin film transistor that is located between the first substrate and the first color filter and is connected to the gate line and the first data line; and
a pixel electrode that is located on the first color filter and is electrically connected to the thin film transistor,
wherein the sub-protrusion of the first color filter protrudes from an edge of the recess toward the protrusion of the second color filter in the second direction and forms a non-overlapping gap of the first color filter in an area where the second color filter and the second data line overlap each other in the plan view,
wherein a contact hole is formed in a non-overlapping region of the first color filter and second color filter, and the contact hole is fully surrounded by the recess of the first color filter and the protrusion of the second color filter,
wherein the pixel electrode is electrically connected to the thin film transistor through the contact hole, and
wherein the pixel electrode overlaps the first color filter and the protrusion of the second color filter.

2. The array substrate of claim 1, wherein a planar shape of the first color filter and a planar shape of the second color filter are the same.

3. The array substrate of claim 1, wherein the first color filter and the second color filter are at least partially superimposed with each other over the second data line.

4. The array substrate of claim 3, wherein the protrusion and the sub-protrusion are at least partially superimposed with the second data line.

5. The array substrate of claim 3, wherein the second data line comprises:
a first portion that is superimposed with both of the first color filter and the second color filter; and
a second portion that is continuous with the first portion, is superimposed with the second color filter, and is not superimposed with the first color filter.

6. The array substrate of claim 5, wherein the second portion is superimposed with the protrusion.

7. The array substrate of claim 3, further comprising:
a shielding electrode that is located on the color filter layer and is superimposed with the second data line,
wherein the shielding electrode comprises a first portion that is superimposed with both of the first color filter and the second color filter, and a second portion that is continuous with the first portion, is superimposed with the second color filter, and is not superimposed with the first color filter.

8. The array substrate of claim 7, wherein the shielding electrode covers the second data line in the plan view.

9. The array substrate of claim 7, wherein the second portion is superimposed with the protrusion.

10. The array substrate of claim 1, wherein the contact hole exposes a portion of a drain electrode of the thin film transistor.

11. The array substrate of claim 7, wherein the shielding electrode and the pixel electrode are made of the same material.

12. A liquid crystal display device comprising:
an array substrate;
a counter substrate facing the array substrate; and
a liquid crystal layer disposed between the array substrate and the counter substrate,
wherein the array substrate comprises a first substrate, a color filter layer disposed on the first substrate, a gate line that is located between the first substrate and the color filter layer and extends in a first direction, a first data line and a second data line that are located between the first substrate and the color filter layer and extend in a second direction intersecting with the first direction, a thin film transistor that is located between the first substrate and the color filter layer is electrically connected to the gate line and the first data line, a pixel electrode that is located on the color filter layer and is electrically connected to the thin film transistor,
wherein the color filter layer comprises a first color filter that is located on the first substrate, has a first side that extends substantially parallel to the second direction, and comprises a recess that is recessed from the first side and a sub-protrusion, and a second color filter that is located on the first substrate to be adjacent to the first color filter along the first direction, has a second side that extends substantially parallel to the second direction, and comprises a protrusion protruding from the second side toward the recess of the first color filter in a plan view,
wherein the sub-protrusion of the first color filter protrudes from an edge of the recess toward the protrusion of the second color filter in the second direction and forms a non-overlapping gap of the first color filter in an area where the second color filter and the second data line overlap each other in the plan view,
wherein the counter substrate comprises a second substrate, and a common electrode located on the second substrate facing the array substrate,
wherein a contact hole is formed in a non-overlapping region of the first color filter and second color filter, and the contact hole is fully surrounded by the recess of the first color filter and the protrusion of the second color filter,
wherein the pixel electrode is electrically connected to the thin film transistor through the contact hole, and
wherein the pixel electrode overlaps the first color filter and the protrusion of the second color filter.

13. The liquid crystal display device of claim 12, wherein the array substrate further comprises:
a shielding electrode that is located on the color filter layer, is spaced apart from the pixel electrode and is superimposed with the second data line,
wherein the first and second color filters are at least partially superimposed with each other over the second data line, and
wherein the contact hole exposes a portion of a drain electrode of the thin film transistor.

14. The liquid crystal display device of claim 13, wherein a voltage of the same level is applied to the common electrode and the shielding electrode.

15. The liquid crystal display device of claim 13, wherein the shielding electrode covers the second data line in the plan view.

16. The liquid crystal display device of claim 13, wherein the shielding electrode and the pixel electrode are made of the same material.

17. The liquid crystal display device of claim 13, wherein the second data line comprises a first portion that is superimposed with both of the first color filter and the second color filter, and a second portion that is continuous with the first portion, is superimposed with the second color filter and is not superimposed with the first color filter.

18. The liquid crystal display device of claim 13, wherein the shielding electrode comprises a first portion that is superimposed with both of the first color filter and the second color filter, and a second portion that is continuous with the first portion, is superimposed with the second color filter and is not superimposed with the first color filter.

19. The liquid crystal display device of claim 13, wherein the counter substrate further comprises:
a light-blocking member located between the second substrate and the common electrode,
wherein the light-blocking member is superimposed with the recess and the thin film transistor.

* * * * *